ized">(12) United States Patent
Datta et al.

(10) Patent No.: US 8,924,322 B2
(45) Date of Patent: Dec. 30, 2014

(54) MULTI-PROCESSOR CORTICAL SIMULATIONS WITH RECIPROCAL CONNECTIONS WITH SHARED WEIGHTS

(75) Inventors: Pallab Datta, San Jose, CA (US); Steven K. Esser, San Jose, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 13/524,798

(22) Filed: Jun. 15, 2012

(65) Prior Publication Data

US 2013/0339281 A1    Dec. 19, 2013

(51) Int. Cl.
G06N 3/00    (2006.01)
G06N 3/02    (2006.01)
G06N 3/06    (2006.01)

(52) U.S. Cl.
CPC ... *G06N 3/02* (2013.01); *G06N 3/06* (2013.01)
USPC .......................................................... 706/29

(58) Field of Classification Search
CPC .............. G06N 3/02; G06N 3/04; G06N 3/06
See application file for complete search history.

(56) References Cited

U.S. PATENT DOCUMENTS

| | | | | |
|---|---|---|---|---|
| 5,150,450 A * | 9/1992 | Swenson et al. | .......... | 706/25 |
| 7,457,787 B1 * | 11/2008 | Furber | .......... | 706/15 |
| 7,502,769 B2 * | 3/2009 | Nugent | .......... | 706/26 |
| 7,818,273 B2 | 10/2010 | Ananthanarayanan et al. | | |
| 8,463,723 B2 * | 6/2013 | Modha et al. | .......... | 706/33 |
| 8,510,239 B2 * | 8/2013 | Modha | .......... | 706/14 |
| 2005/0086436 A1 * | 4/2005 | Modha | .......... | 711/133 |
| 2009/0099989 A1 | 4/2009 | Ananthanarayanan et al. | | |
| 2009/0292661 A1 * | 11/2009 | Haas | .......... | 706/33 |
| 2010/0220523 A1 * | 9/2010 | Modha et al. | .......... | 365/167 |
| 2010/0223220 A1 * | 9/2010 | Modha et al. | .......... | 706/33 |
| 2010/0299297 A1 * | 11/2010 | Breitwisch et al. | .......... | 706/33 |
| 2011/0004579 A1 * | 1/2011 | Snider | .......... | 706/25 |
| 2011/0016071 A1 | 1/2011 | Guillen et al. | | |
| 2011/0047109 A1 | 2/2011 | McKinstry et al. | | |
| 2011/0119214 A1 * | 5/2011 | Breitwisch et al. | .......... | 706/33 |
| 2011/0153533 A1 * | 6/2011 | Jackson et al. | .......... | 706/17 |
| 2011/0182349 A1 | 7/2011 | Ananthanarayanan et al. | | |

(Continued)

FOREIGN PATENT DOCUMENTS

WO        02069137 A1    9/2002

OTHER PUBLICATIONS

Wu et al., "Architectural Design and Complexity Analysis of Large-Scale Cortical Simulation on a Hybrid Computing Platform", Proceedings of the 2007 IEEE Symposium on Computational Intelligence in Security and Defense Applications (CISDA 2007), Apr. 2007, pp. 201-205, IEEE, Honolulu, United States.

*Primary Examiner* — Jeffrey A Gaffin
*Assistant Examiner* — Paulinho E Smith
(74) *Attorney, Agent, or Firm* — Kenneth L. Sherman, Esq.; Michael Zarrabian, Esq.; Sherman & Zarrabian LLP (57) ABSTRACT

Embodiments of the invention relate to distributed simulation frameworks that provide reciprocal communication. One embodiment comprises interconnecting neuron groups on different processors via a plurality of reciprocal communication pathways, and facilitating the exchange of reciprocal spiking communication between two different processors using at least one Ineuron module. Each processor includes at least one neuron group. Each neuron group includes at least one electronic neuron.

20 Claims, 9 Drawing Sheets

(56) References Cited

U.S. PATENT DOCUMENTS

| | | | |
|---|---|---|---|
| 2012/0084240 A1* | 4/2012 | Esser et al. | 706/27 |
| 2012/0084241 A1* | 4/2012 | Friedman et al. | 706/27 |
| 2012/0109863 A1* | 5/2012 | Esser et al. | 706/25 |
| 2012/0109864 A1* | 5/2012 | Modha | 706/25 |
| 2012/0109866 A1* | 5/2012 | Modha | 706/28 |
| 2012/0150781 A1* | 6/2012 | Arthur et al. | 706/35 |
| 2012/0173471 A1* | 7/2012 | Ananthanarayanan et al. | 706/25 |
| 2012/0259804 A1* | 10/2012 | Brezzo et al. | 706/25 |
| 2012/0265719 A1* | 10/2012 | Modha et al. | 706/15 |
| 2013/0031040 A1* | 1/2013 | Modha | 706/27 |
| 2013/0073493 A1* | 3/2013 | Modha | 706/25 |
| 2013/0073494 A1* | 3/2013 | Modha | 706/25 |
| 2013/0073497 A1* | 3/2013 | Akopyan et al. | 706/27 |
| 2013/0198121 A1* | 8/2013 | Modha et al. | 706/26 |
| 2013/0339281 A1* | 12/2013 | Datta et al. | 706/29 |
| 2014/0032464 A1* | 1/2014 | Esser et al. | 706/26 |
| 2014/0032465 A1* | 1/2014 | Modha | 706/27 |
| 2014/0081893 A1* | 3/2014 | Modha | 706/25 |
| 2014/0180987 A1* | 6/2014 | Arthur et al. | 706/25 |
| 2014/0214739 A1* | 7/2014 | Esser et al. | 706/44 |
| 2014/0222740 A1* | 8/2014 | Alvarez-Icaza Rivera et al. | 706/28 |

* cited by examiner

MULTI-PROCESSOR CORTICAL SIMULATIONS WITH RECIPROCAL CONNECTIONS WITH SHARED WEIGHTS

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation, and in particular, a distributed simulation framework that allows for reciprocal communication.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance changes with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

Embodiments of the invention relate to distributed simulation frameworks that provide reciprocal communication. One embodiment comprises interconnecting neuron groups on different processors via a plurality of reciprocal communication pathways, and facilitating the exchange of reciprocal spiking communication between two different processors using at least one Ineuron module. Each processor includes at least one neuron group. Each neuron group includes at least one electronic neuron.

Another embodiment comprises multiple processors, wherein each processor includes at least one neuron group. Each neuron group includes at least one electronic neuron. A plurality of reciprocal communication pathways interconnects neuron groups on different processors. At least one Ineuron module facilitates the exchange of reciprocal spiking communication between two different processors.

These and other features, aspects and advantages of the present invention will become understood with reference to the following description, appended claims and accompanying figures.

DETAILED DESCRIPTION

Embodiments of the invention relate to neuromorphic and synaptronic computation, and in particular, a distributed simulation framework that allows for reciprocal communication. One embodiment comprises interconnecting neuron groups on different processors via a plurality of reciprocal communication pathways, and facilitating the exchange of reciprocal spiking communication between two different processors using at least one Ineuron module. Each processor includes at least one neuron group. Each neuron group includes at least one electronic neuron.

Another embodiment comprises multiple processors, wherein each processor includes at least one neuron group. Each neuron group includes at least one electronic neuron. A plurality of reciprocal communication pathways interconnects neuron groups on different processors. At least one Ineuron module facilitates the exchange of reciprocal spiking communication between two different processors.

In one embodiment, the plurality of reciprocal communication pathways include at least one unweighted forward communication pathway and at least one unweighted backward communication pathway configured for information flow in a first direction and a second direction opposite to the first direction, respectively. Each unweighted forward communication pathway has a reciprocal unweighted backward communication pathway. The plurality of reciprocal communication pathways further include at least one weighted forward communication pathway and at least one weighted backward communication pathway configured for information flow in the first direction and the second direction, respectively. Each weighted forward communication pathway has a reciprocal weighted backward communication pathway.

Each Ineuron module is configured to receive spikes from at least one neuron in a neuron group on a remote processor via an unweighted forward communication pathway interconnecting the neuron group on the remote processor to said Ineuron module. Each Ineuron module is further configured to distribute the received spikes to at least one neuron in a neuron group on a local processor via a weighted forward communication pathway interconnecting said Ineuron module to the neuron group on the local processor.

Each Ineuron module includes a memory unit maintaining synaptic weights of every weighted forward communication pathway and every weighted backward communication pathway that said Ineuron module is connected to.

Each Ineuron module is further configured to assign a synaptic weight to a received spike before distributing the received spike to at least one neuron in a neuron group on the local processor. The synaptic weight assigned is equal to a synaptic weight of a weighted forward communication pathway delivering the received spike to the neuron group on the local processor.

Each Ineuron module is further configured to receive spikes from at least one spiking neuron in a neuron group on the local processor via a weighted backward communication pathway interconnecting the neuron group on the local processor to said Ineuron module. Each Ineuron module is further configured to compute an aggregated synaptic weight, wherein the computed aggregated synaptic weight is the sum of the synaptic weights of every weighted backward communication pathway interconnecting a spiking neuron on the local processor to said Ineuron module. Each Ineuron module is further configured to deliver the computed aggregated synaptic weight to at least one neuron in a neuron group on the remote processor via an unweighted backward communication pathway interconnecting the neuron group on the remote processor to said Ineuron module.

Each weighted forward communication pathway has a synaptic weight that is equal to a synaptic weight of a reciprocal weighted backward communication pathway.

Each neuron is configured to integrate aggregated synaptic weights and spikes into a membrane potential of said neuron, and generate a spike signal in response to the membrane potential of said neuron reaching a threshold of said neuron.

The term electronic neuron as used herein represents an framework configured to simulate a biological neuron. An electronic neuron creates connections between processing elements that are roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic framework comprising circuitry, and additionally as a computer simulation. Indeed, embodiments of the invention can take the form of an entirely hardware embodiment, an entirely software embodiment or an embodiment containing both hardware and software elements.

Cortical simulation is an essential component in computational neuroscience. A cortical or neural network simulator may be implemented using a computer system including multiple processors. Each processor may have rapid access to a block of main memory assigned to said processor. Each processor is configured to compute the entire state of one or more neurons. Information pertaining to said one or more neurons is stored on the block of main memory block assigned to said processor, thereby enabling rapid access to said information.

Communication between processors, however, may be much slower than communication between a processor and the block of main memory assigned to it. This is especially challenging in large-scale cortical simulators, such as cortical simulators at a mammalian scale. Large-scale cortical simulators consume an enormous amount of communication bandwidth, memory, and parallel processor cycles.

Embodiments of a distributed simulation framework for a cortical simulator are provided, wherein the simulation framework enables efficient reciprocal communication between neurons on different processors. Embodiments of the distributed simulation framework disclosed herein can be used to implement large-scale cortical simulators that include hundreds of thousands of processors.

Figure 1:
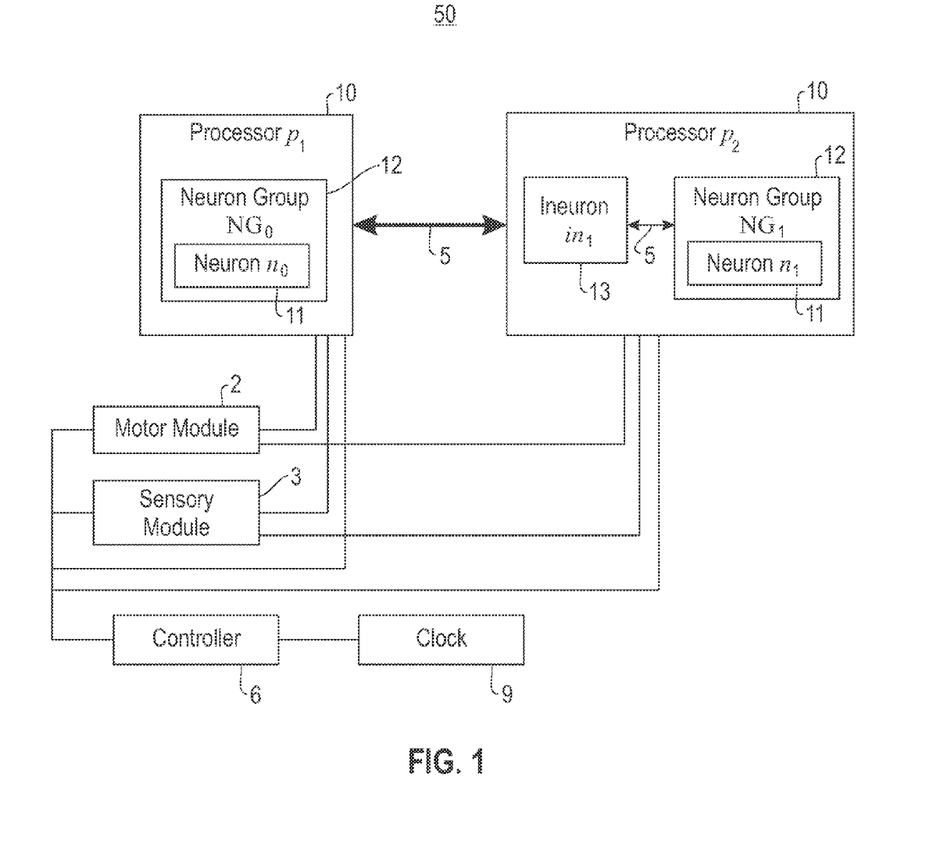
FIG. 1 is a block diagram illustrating a distributed simulation framework, in accordance with an embodiment of the invention.

FIG. 1 is a block diagram illustrating a distributed simulation framework 50, in accordance with an embodiment of the invention. The framework 50 comprises a plurality of processors 10, such as processors $p_1$ and $p_2$. Each processor 10 comprises one or more neuron groups 12, wherein each neuron group 12 includes at least one neuron 11. For example, as shown in FIG. 1, the processor $p_1$ includes a neuron $n_0$ in a neuron group $NG_0$, and the processor $p_2$ includes a neuron $n_1$ in a neuron group $NG_1$.

As described in detail later herein, the framework 50 allows for bidirectional delivery of information (e.g., spikes, aggregated synaptic weights) between neurons 11 on different processors 10. Specifically, the framework 50 further comprises multiple reciprocal communication pathways 5 and at least one Ineuron module 13. The reciprocal communication pathways 5 provide inter-processor connectivity as well as intra-processor connectivity. Each Ineuron module 13 is an efficient scalable communication infrastructure that facilitates bidirectional delivery of information (e.g., spikes) between a pair of processors 10.

As shown in FIG. 1, each neuron group 12 may also be connected to external spiking systems such as motor modules 2 and sensory modules 3. A motor module 2 represents a motor control system configured to provide motor output. A sensory module 3 represents a sensory transducer configured to provide sensory input.

Also shown in FIG. 1, the framework 50 further comprises a control module ("controller") 6 that is connected to a clock 9. The clock 9 produces clock signals used by the controller 6 to generate time-steps. The controller 6 divides each time-step into operational phases in the framework 50 for neuron updates, etc. In one embodiment, each processor 10 has its own controller 6 and clock 9.

Figure 2:
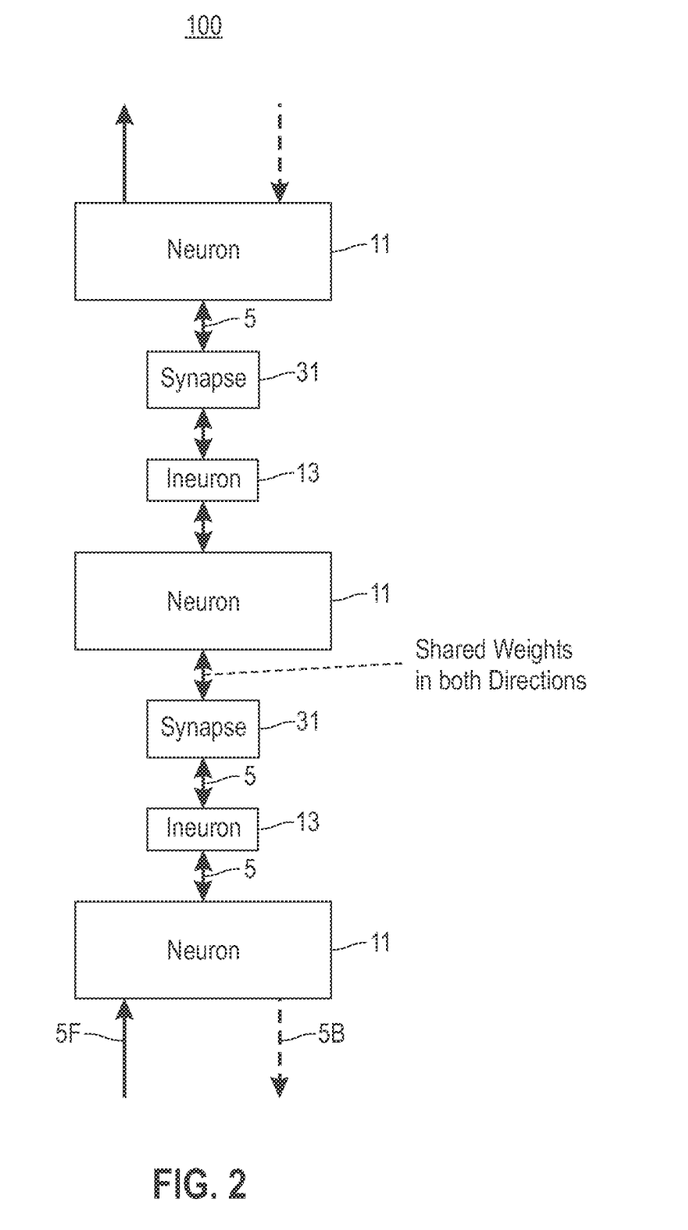
FIG. 2 is a block diagram illustrating a neural network with reciprocal connectivity between neurons, in accordance with an embodiment of the invention.

FIG. 2 is a block diagram illustrating a neural network 100 with reciprocal connectivity between neurons 11, in accordance with an embodiment of the invention. The neural network 100 comprises multiple neurons 11, multiple synapses 31, and multiple reciprocal communication pathways 5.

The neural network 100 further comprises multiple Ineuron modules 13 that facilitate bidirectional communication between the neurons 11. Each reciprocal communication pathway 5 can be classified one of the following: a forward communication pathway 5F, or a backward communication pathway 5B. Information (e.g., spikes) propagates between the neurons 11 in a first direction ("forward direction") via forward communication pathways 5F. Information also propagates between the neurons 11 in a second direction opposite of the forward direction ("backward direction") via backward communication pathways 5B.

A source neuron 11 is a neuron 11 that generates a spike. A target neuron 11 is a neuron 11 that receives a spike from a source neuron 11. For each source neuron 11, spikes generated by said source neuron 11 are delivered to a corresponding Ineuron module 13 in the forward direction. Each Ineuron module 13 has a corresponding synapse 31 having a synaptic weight. Each Ineuron module 13 distributes the spikes received from a source neuron 11 to a target neuron 11 in the forward direction. Each spike distributed by each Ineuron module 13 in the forward direction is assigned a synaptic weight that equals the synaptic weight of a synapse 31 corresponding to said Ineuron module 13. Each synapse 31 is reconfigurable for learning rules such as Hebbian, anti-Hebbian, spike-timing-dependent-plasticity (STDP), or anti-STDP.

In response to the spikes received from a source neuron 11, a target neuron 11 may generate a spike when its membrane potential reaches a spiking threshold. The target neuron 11 delivers the spikes generated to the source neuron 11 in the backward direction. Each spike generated by a target neuron 11 is assigned the same synaptic weight as the synaptic weight assigned to spikes received by the target neuron 11. As such, the synaptic weight of a synapse 31 interconnecting two neurons 11 is shared between the two neurons 11 in both the forward direction and the backward direction.

Figure 3:
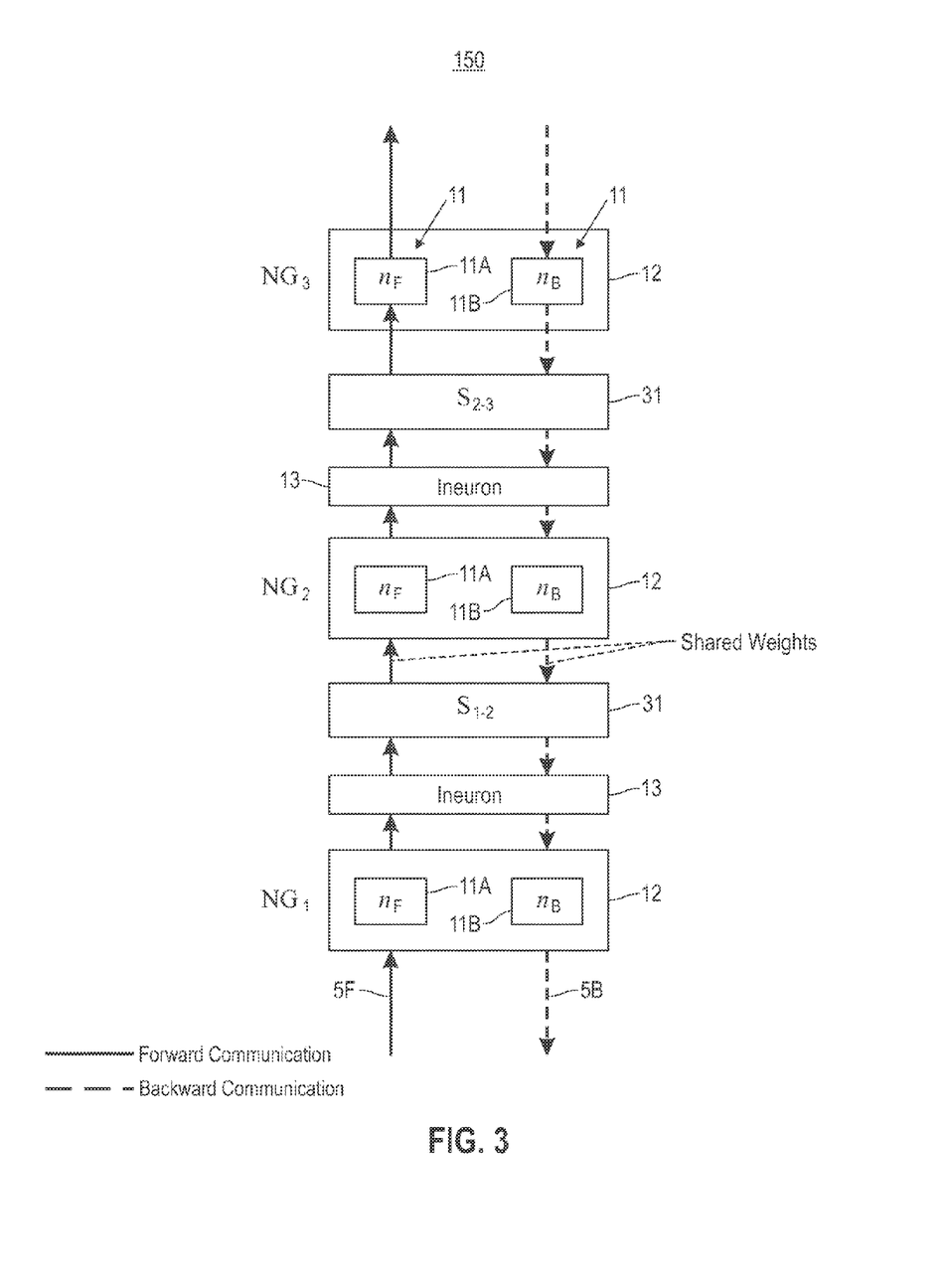
FIG. 3 is a block diagram illustrating a neural network with reciprocal connectivity between neuron groups, wherein each neuron group comprises two neurons, in accordance with an embodiment of the invention.

FIG. 3 is a block diagram illustrating a neural network 150 with reciprocal connectivity between neuron groups 12, wherein each neuron group 12 comprises two neurons 11, in accordance with an embodiment of the invention. The neural network 150 comprises multiple neuron groups 12, such as $NG_1$, $NG_2$, and $NG_3$. Each neuron group 12 comprises one or more neurons 11. As shown in FIG. 3, each neuron group 12 comprises two neurons 11. The neural network 150 further comprises multiple Ineuron modules 13 and multiple synapses 31, such as synapses $S_{1-2}$ and $S_{2-3}$.

The neural network 150 allows for bidirectional communication between the neuron groups 12. Information (e.g., spikes) propagate between the neuron groups 12 in the forward direction and the backward direction.

Each neuron 11 in a neuron group 12 is classified as a forward neuron 11A or a backward neuron 11B. As shown in FIG. 3, each neuron group 12 comprises a forward neuron 11A ($n_F$) and a backward neuron 11B ($n_B$). A forward neuron 11A communicates (e.g., transmit spikes) with a forward neuron 11A in a different neuron group 12 in the forward direction. A backward neuron 11B communicates with another backward neuron 11B in a different neuron group 12 in the backward direction. Each forward neuron 11A in a neuron group 12 has a corresponding backward neuron 11B in the same neuron group 12.

A source neuron group 12 is a neuron group 12 including neurons 11 that generate spikes. A target neuron group 12 is a neuron group 12 including neurons 11 that receive spikes from a source neuron group 12.

For each source forward neuron 11A, spikes generated by said source forward neuron 11A are delivered to a corresponding Ineuron module 13 in the forward direction. Each Ineuron module 13 has a corresponding synapse 31 having a synaptic weight. Each Ineuron module 13 distributes the spikes received from a source forward neuron 11A to a target forward neuron 11A in the forward direction. Each spike distributed by each Ineuron module 13 in the forward direction is assigned a synaptic weight that equals the synaptic weight of a synapse 31 corresponding to said Ineuron module 13.

In response to the spikes received from a source forward neuron 11, a target forward neuron 11A and a target backward neuron 11B corresponding to the target forward neuron 11A may generate a spike. The target backward neuron 11B delivers the spikes generated to a source backward neuron 11B corresponding to the source forward neuron 11A, wherein the spikes are delivered in the backward direction. Each spike generated by a backward neuron 11B is assigned the same synaptic weight as the synaptic weight assigned to spikes received by a forward neuron 11A corresponding to the backward neuron 11B. As such, the synaptic weight of a synapse 31 interconnecting two neuron groups 12 is shared between the two neuron groups 12 in both the forward direction and the backward direction.

Figure 4:
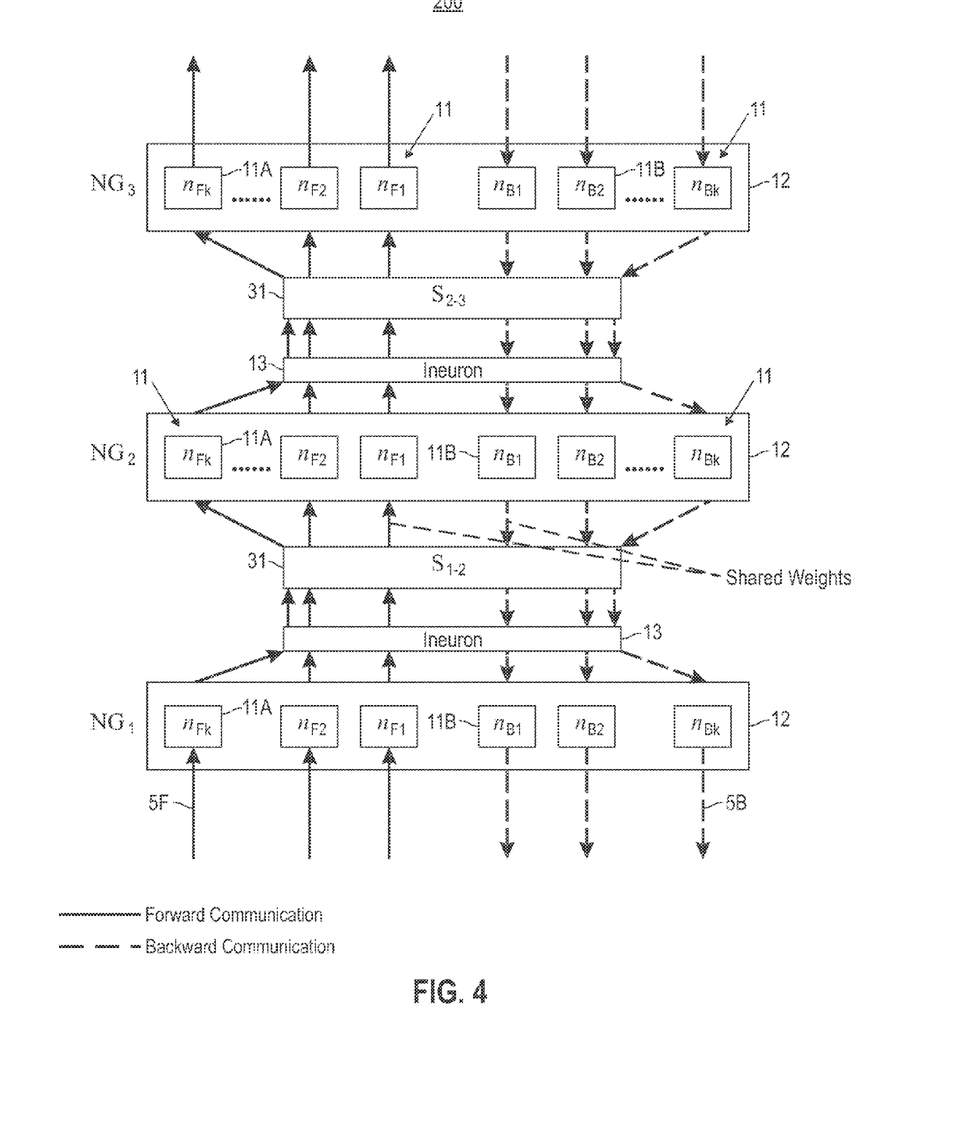
FIG. 4 is a block diagram illustrating a neural network with reciprocal connectivity between neuron groups, wherein each neuron group comprises multiple neurons, in accordance with an embodiment of the invention.

FIG. 4 is a block diagram illustrating a neural network 200 with reciprocal connectivity between neuron groups 12, wherein each neuron group 12 comprises multiple neurons 11, in accordance with an embodiment of the invention. The neural network 200 comprises multiple neuron groups 12, such as such as $NG_1$, $NG_2$, and $NG_3$. Each neuron group 12 comprises one or more neurons 11. As shown in FIG. 4, the number of neurons 11 in each neuron group 12 is equal to 2k, where k is a positive integer.

Specifically, each neuron group 12 includes k forward neurons 11A, such as neurons $n_{F1}$, $n_{F2}$, ..., and $n_{Fk}$, and k backward neurons 11B, such as neurons $n_{B1}$, $n_{B2}$, ..., and $n_{Bk}$. The neural network 200 further comprises multiple Ineuron modules 13 and multiple synapses 31, such as synapses $S_{1-2}$ and $S_{2-3}$.

The neural network 200 allows for bidirectional communication between the neuron groups 12. Information (e.g., spikes) propagates between the neuron groups 12 in the forward direction and the backward direction.

For each source forward neuron 11A, spikes generated by said source forward neuron 11A are delivered to a corresponding Ineuron module 13 in the forward direction. Each Ineuron module 13 has a corresponding synapse 31 having a synaptic weight. Each Ineuron module 13 distributes the spikes received from a source forward neuron 11A to a target forward neuron 11A in the forward direction. Each spike distributed by each Ineuron module 13 in the forward direction is assigned a synaptic weight that equals the synaptic weight of a synapse 31 corresponding to said Ineuron module 13.

In response to the spikes received from a source forward neuron 11, a target forward neuron 11A and a target backward neuron 11B corresponding to the target forward neuron 11A may generate a spike. The target backward neuron 11B delivers the spikes generated to a source backward neuron 11B corresponding to the source forward neuron 11A, wherein the spikes are delivered in the backward direction. Each spike generated by a backward neuron 11B is assigned the same synaptic weight as the synaptic weight assigned to spikes received by a forward neuron 11A corresponding to the backward neuron 11B. As such, the synaptic weight of a synapse 31 interconnecting two neuron groups 12 is shared between the two neuron groups 12 in both the forward direction and the backward direction.

Figure 5:
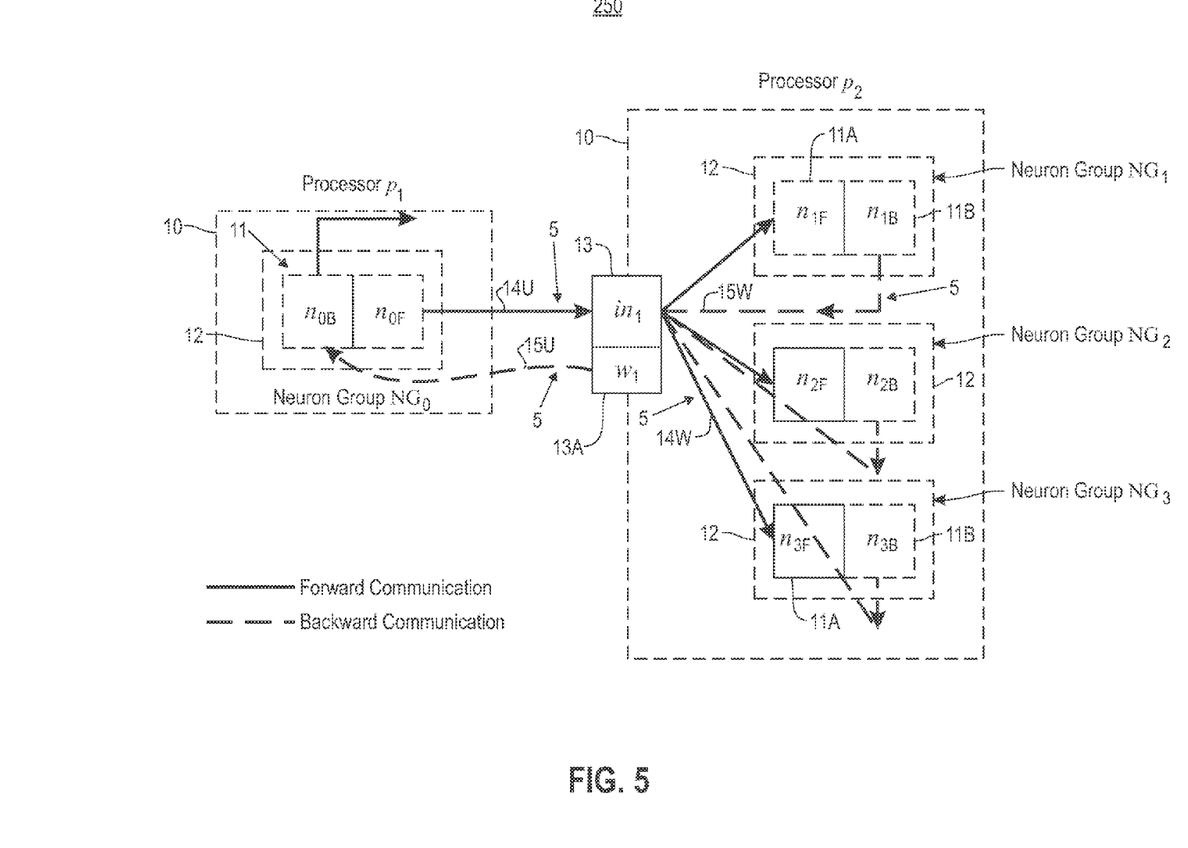
FIG. 5 is a block diagram illustrating a distributed simulation framework that allows reciprocal communication between two processors, in accordance with an embodiment of the invention.

FIG. 5 is a block diagram illustrating a distributed simulation framework 250 that allows reciprocal communication between two processors 10, in accordance with an embodiment of the invention. The framework 250 comprises multiple processors 10, such as processors $p_1$ and $p_2$. Each processor 10 comprises at least one neuron group 12. As shown in FIG. 5, processor $p_1$ includes neuron group $NG_0$, and processor $p_2$ includes neuron groups $NG_1$, $NG_2$, and $NG_3$.

Each neuron group 12 comprises at least one neuron 11. As shown in FIG. 5, each neuron group 12 in the framework 250 comprises a forward neuron 11A and a corresponding backward neuron 11B. Specifically, the neuron group $NG_0$ includes a forward neuron $n_{0F}$ and a corresponding backward neuron $n_{0B}$, the neuron group $NG_1$ includes a forward neuron $n_{1F}$ and a corresponding backward neuron $n_{1B}$, the neuron group $NG_2$ includes a forward neuron $n_{2F}$ and a corresponding backward neuron $n_{2B}$, and the neuron group $NG_3$ includes a forward neuron $n_{3F}$ and a corresponding backward neuron $n_{3B}$.

The framework 250 further comprises multiple reciprocal communication pathways 5. Each forward communication pathway 5F (FIG. 2) can be classified as one of the following: an unweighted forward communication pathway 14U configured for information flow in the forward direction, or a weighted forward communication pathway 14W configured for information flow in the forward direction. Each backward communication pathway 5B (FIG. 2) can be classified as one of the following: an unweighted backward communication pathway 15U configured for information flow in the backward direction, or a weighted backward communication pathway 15W configured for information flow in the backward direction. Each weighted forward communication pathway 14W and each weighted backward communication pathway 15W has a synaptic weight.

Each unweighted forward communication pathway 14U has a reciprocal unweighted backward communication pathway 15U. Each weighted forward communication pathway 14W has a reciprocal weighted backward communication pathway 15W. For each weighted forward communication pathway 14W, a synaptic weight of said weighted forward communication pathway 14W is the same as a synaptic weight of a reciprocal weighted backward communication pathway 15W.

As described in detail later herein, the unweighted forward communication pathways 14U and the unweighted backward communication pathways 15U facilitate inter-processor communication. The weighted forward communication pathways 14W and the weighted backward communication pathways 15W facilitate intra-processor communication.

The framework 250 further comprises at least one Ineuron module 13. Each Ineuron module 13 facilitates the exchange of information, and minimizes communication bandwidth, between a pair of processors 10. As shown in FIG. 5, the processor $p_2$ further includes an Ineuron module $in_1$. The processor $p_2$ is a local processor 10 relative to the Ineuron module $in_1$. The processor $p_1$ is a remote processor 10 relative to the Ineuron module $in_1$.

Each Ineuron module 13 has a corresponding neuron group 12 on a remote processor 10. Specifically, each Ineuron module 13 is interconnected to a corresponding neuron group 12 on a remote processor 10 via at least one unweighted forward communication pathway 14U and at least one reciprocal unweighted backward communication pathway 15U. Each unweighted forward communication pathway 14U delivers spikes generated by a forward neuron 11A in a connected neuron group 12 to a connected Ineuron module 13. As described in detail later herein, each unweighted backward communication pathway 15U delivers an aggregated synaptic weight computed by a connected Ineuron module 13 to a backward neuron 11B in a connected neuron group 12.

If a processor 10 has more than one neuron group 12 functioning as a source neuron group 12, each source neuron group 12 on the processor 10 may have its own set of connections (i.e., at least one unweighted forward communication pathway 14U and at least one reciprocal unweighted backward communication pathway 15U) connecting said source neuron group 12 to a corresponding Ineuron module 13 on a different processor 10.

Each Ineuron module 13 distributes spikes received from a corresponding neuron group 12 on a remote processor 10 to at least one neuron group 12 on a local processor 10. Specifically, each Ineuron module 13 is interconnected to a neuron group 12 on a local processor 10 via at least one weighted forward communication pathway 14W and at least one reciprocal weighted backward communication pathway 15W. Each weighted forward communication pathway 14W delivers the synaptic weight of said weighted forward communication pathway 14W to a forward neuron 11A in a connected neuron group 12 when a connected Ineuron module 13 receives a spike. A weighted backward communication pathway 15W delivers the synaptic weight of the weighted backward communication pathway 15W to a connected Ineuron module 13 when a connected backward neuron 11B spikes.

Each Ineuron module 13 has a memory unit 13A maintaining information describing a corresponding neuron group 12 on a remote processor 10 that said Ineuron module 13 is interconnected to. The memory unit 13A of each Ineuron module 13 further maintains information describing every neuron group 12 on the local processor 10 that said Ineuron module 13 is interconnected to via weighted forward communication pathways 14W and reciprocal weighted backward communication pathways 15W. The memory unit 13A further maintains the synaptic weights $w_i$ of every weighted forward communication pathway 14W and reciprocal weighted backward communication pathway 15W that said Ineuron module 13 is connected to. As stated above, each weighted forward communication pathway 14W shares the same synaptic weight as its reciprocal weighted backward communication pathway 15W.

As shown in FIG. 5, neuron group $NG_0$ on processor $p_1$ is the corresponding neuron group 12 on a remote processor 10 for Ineuron module $in_1$. Ineuron module $in_1$ is interconnected to forward neuron $n_{0F}$ and backward neuron $n_{0B}$ in neuron group $NG^0$ on remote processor $p_1$ via a first unweighted forward communication pathway 14U and a first reciprocal unweighted backward communication pathway 15U, respectively.

Ineuron module $in_1$ is further interconnected to every neuron group 12 on processor $p_2$. A first weighted forward communication pathway 14W interconnects Ineuron module $in_1$ to forward neuron $n_{1F}$ in neuron group $NG_1$, a second weighted forward communication pathway 14W interconnects Ineuron module $in_1$ to forward neuron $n_{2F}$ in neuron group $NG_2$, and a third weighted forward communication pathway 14W interconnects Ineuron module $in_1$ to forward neuron $n_{3F}$ in neuron group $NG_3$. Spikes received by Ineuron module $in_1$ from forward neurons 11A on the remote processor $p_1$ are distributed to every forward neuron 11A on the local processor $p_2$ via the weighted forward communication pathways 14W.

Further, a first weighted backward communication pathway 15W interconnects backward neuron $n_{1B}$ in neuron group $NG_1$ to Ineuron module $in_1$, a second weighted backward communication pathway 15W interconnects backward neuron $n_{2B}$ in neuron group $NG_2$ to Ineuron module $in_1$, and a third weighted backward communication pathway 15W interconnects backward neuron $n_{3B}$ in neuron group $NG_3$ to Ineuron module $in_1$. The first weighted backward communication pathway 15W has the same synaptic weight as the first weighted forward communication pathway 14W, the second weighted backward communication pathway 15W has the same synaptic weight as the second weighted forward communication pathway 14W, and the third weighted backward communication pathway 15W has the same synaptic weight as the third weighted forward communication pathway 14W.

Each Ineuron module 13 assigns synaptic weights to the spikes received based on the synaptic weights maintained in the container 13A of said Ineuron module 13. Specifically, a synaptic weight assigned to a received spike is equal to a synaptic weight of a weighted forward communication pathway 14W delivering the spike. For example, as shown in FIG. 5, a spike delivered via the first weighted forward communication pathway 14W is assigned the synaptic weight of the first weighted forward communication pathway 14W. As such, a spike received by the forward neuron $n_{1F}$ is weighted according to the synaptic weight of the first weighted forward communication pathway 14W.

To reduce the number of bits communicated between processors 10, each Ineuron module 13 computes an aggregated synaptic weight of all spiking neurons 11 on the local processor 10. The aggregated synaptic weight is the sum of the synaptic weights of all weighted backward communication pathways 15W interconnecting the spiking neurons 11 on the local processor 10 to the Ineuron module 13. An aggregated synaptic weight computed by an Ineuron module 13 is delivered to at least one neuron group 12 on a corresponding remote processor 10 via an unweighted backward communication pathway 15U.

In another embodiment, each neuron group 12 has multiple forward neurons 11A and multiple backward neurons 11B. Each forward neuron 11A and each backward neuron 11B in a neuron group 12 on a remote processor 10 has its own unweighted forward communication pathway 14U and unweighted backward communication pathway 15U interconnecting said forward neuron 11A and said backward neuron 11B, respectively, to an Ineuron module 13 on a local processor 10. Each forward neuron 11A and each backward neuron 11B in at least one neuron group 12 on the local processor 10 has its own weighted forward communication pathway 14W and weighted backward communication pathway 15W interconnecting said forward neuron 11A and said backward neuron 11B, respectively, to the Ineuron module 13.

Each backward neuron 11B in each neuron group 12 is designated with an index, for example an index of value "1" indicating a first backward neuron 11B in said neuron group 12. The Ineuron module 13 computes a separate aggregated synaptic weight for each index value. For example, if the first backward neuron in every neuron group 12 on the local processor 10 spikes, the Ineuron module 13 computes an aggregated synaptic weight that is equal to the sum of the synaptic weights of every weighted backward communication pathway 15W interconnecting a first backward neuron 11B on the local processor 10 to the Ineuron module 13. If the second backward neuron in every neuron group 12 on the local processor 10 spikes, the Ineuron module 13 computes a different aggregated synaptic weight that is equal to the sum of the synaptic weights of every weighted backward communication pathway 15W interconnecting a second backward neuron 11B on the local processor 10 to the Ineuron module 13.

As such, the neural network 250 allows for a backward neuron 11B in a neuron group 12 on a remote processor 10 to receive a single message including an aggregated synaptic weight as opposed to multiple messages including individual synaptic weights from spiking neurons 11 on a different processor 10. Communicating only the aggregated synaptic weights along unweighted backward communication pathways 15U helps reduce communication bandwidth between two different processors 10.

The neural network 250 also removes the need to duplicate synapses and maintain consistent synaptic weights on two different processors 10 to enable reciprocal communication between the processors 10, thereby conserving memory space and reducing communication bandwidth.

Each backward neuron 11B adds each aggregated synaptic weight received to a membrane potential (i.e., activation level) of said backward neuron 11B. Each neuron 11 spikes when a membrane potential of said neuron 11 reaches a spike threshold of said neuron 11.

Figure 6:
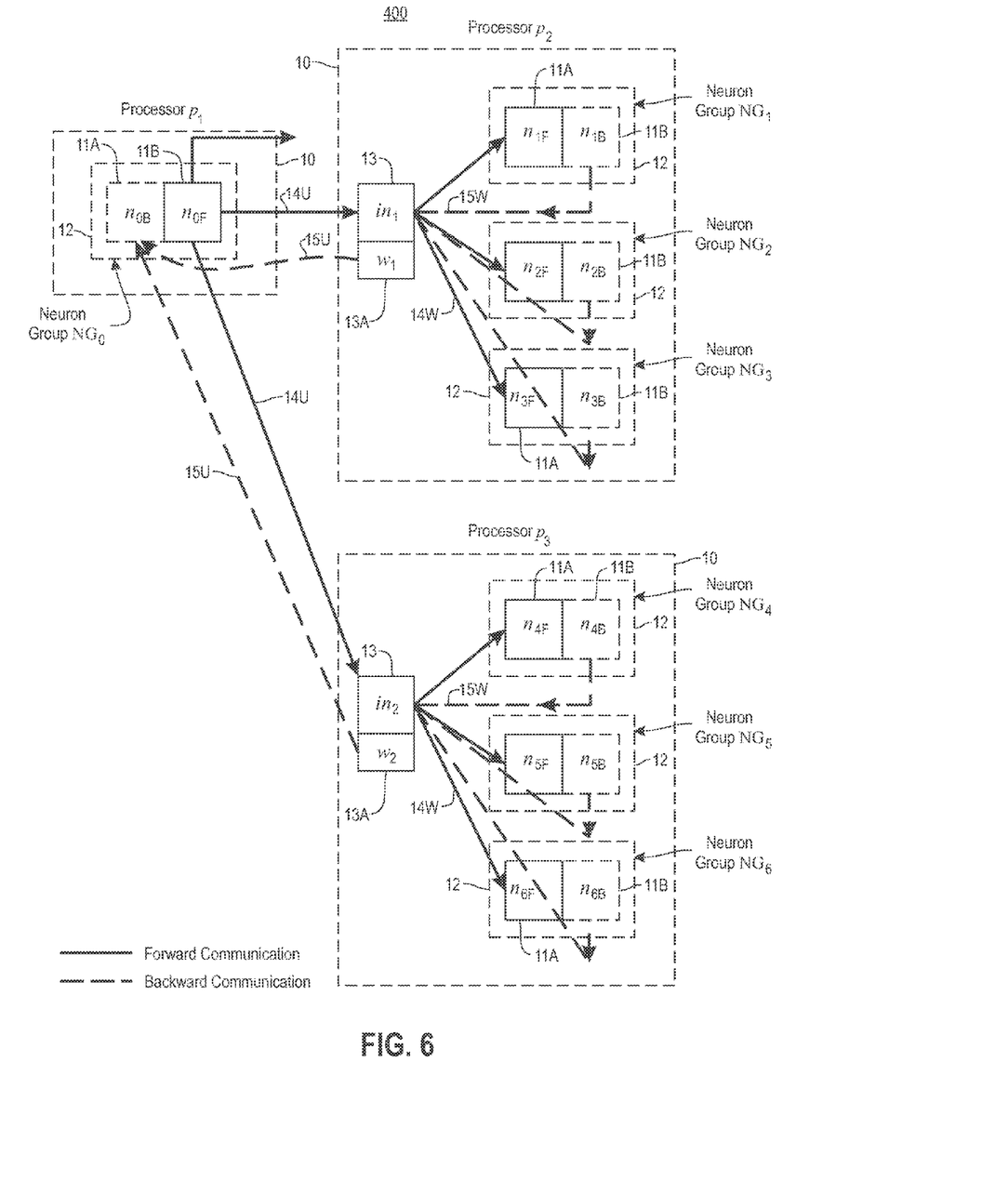
FIG. 6 is a block diagram illustrating a distributed simulation framework that allows reciprocal communication between multiple processors, in accordance with an embodiment of the invention.

FIG. 6 is a block diagram illustrating a distributed simulation framework 400 that allows reciprocal communication between multiple processors 10, in accordance with an embodiment of the invention. The framework 400 comprises multiple processors 10, such as processors $p_1$, $p_2$ and $p_3$. Each processor 10 comprises at least one neuron group 12. As shown in FIG. 6, processor $p_1$ includes neuron group $NG_0$, processor $p_2$ includes neuron groups $NG_1$, $NG_2$, and $NG_3$, and processor $p_3$ includes neuron groups $NG_4$, $NG_5$, and $NG_6$.

Each neuron group 12 comprises at least one neuron 11. As shown in FIG. 6, each neuron group 12 in the framework 400 comprises a forward neuron 11A and a corresponding backward neuron 11B. Specifically, the neuron group $NG_0$ includes a forward neuron $n_{0F}$ and a corresponding backward neuron $n_{0B}$, the neuron group $NG_1$ includes a forward neuron $n_{1F}$ and a corresponding backward neuron $n_{1B}$, the neuron group $NG_2$ includes a forward neuron $n_{2F}$ and a corresponding backward neuron $n_{2B}$, the neuron group $NG_3$ includes a forward neuron $n_{3F}$ and a corresponding backward neuron $n_{3B}$, the neuron group $NG_4$ includes a forward neuron $n_{4F}$ and a corresponding backward neuron $n_{4B}$, the neuron group $NG_5$ includes a forward neuron $n_{5F}$ and a corresponding backward neuron $n_{5B}$, and the neuron group $NG_6$ includes a forward neuron $n_{6F}$ and a corresponding backward neuron $n_{6B}$.

The framework 400 further comprises multiple communication pathways 5 and multiple Ineuron modules 13. As shown in FIG. 6, processor $p_2$ further includes an Ineuron module $in_1$, and processor $p_3$ further includes an Ineuron module $in_2$.

As shown in FIG. 6, processor $p_1$ is the corresponding remote processor 10 for Ineuron modules $in_1$ and $in_2$. Ineuron module $in_1$ is interconnected to forward neuron $n_{0F}$ and backward neuron $n_{0B}$ in neuron group $NG_0$ on remote processor $p_1$ via a first unweighted forward communication pathway 14U and a first reciprocal unweighted backward communication pathway 15U, respectively. Ineuron module $in_2$ is interconnected to forward neuron $n_{0F}$ and backward neuron $n_{0B}$ in neuron group $NG_0$ on remote processor $p_1$ via a second unweighted forward communication pathway 14U and a second reciprocal unweighted backward communication pathway 15U, respectively.

Ineuron module $in_1$ is further interconnected to every neuron group 12 on processor $p_2$. A first weighted forward communication pathway 14W interconnects Ineuron module $in_1$ to forward neuron $n_{1F}$ in neuron group $NG_1$, a second weighted forward communication pathway 14W interconnects Ineuron module $in_1$ to forward neuron $n_{2F}$ in neuron group $NG_2$, and a third weighted forward communication pathway 14W interconnects Ineuron module $in_1$ to forward neuron $n_{3F}$ in neuron group $NG_3$. Spikes received by Ineuron module $in_1$ from forward neurons 11A on the remote processor $p_1$ are distributed to every forward neuron 11A on the local processor $p_2$ via the weighted forward communication pathways 14W.

Further, a first weighted backward communication pathway 15W interconnects backward neuron $n_{1B}$ in neuron group $NG_1$ to Ineuron module $in_1$, a second weighted backward communication pathway 15W interconnects backward neuron $n_{2B}$ in neuron group $NG_2$ to Ineuron module $in_1$, and a third weighted backward communication pathway 15W interconnects backward neuron $n_{3B}$ in neuron group $NG_3$ to Ineuron module $in_1$. The first weighted backward communication pathway 15W has the same synaptic weight as the first weighted forward communication pathway 14W, the second weighted backward communication pathway 15W has the same synaptic weight as the second weighted forward communication pathway 14W, and the third weighted backward communication pathway 15W has the same synaptic weight as the third weighted forward communication pathway 14W.

Ineuron module $in_2$ is further interconnected to every neuron group 12 on processor $p_3$. A fourth weighted forward communication pathway 14W interconnects Ineuron module $in_2$ to forward neuron $n_{4F}$ in neuron group $NG_4$, a fifth weighted forward communication pathway 14W interconnects Ineuron module $in_2$ to forward neuron $n_{5F}$ in neuron group $NG_5$, and a sixth weighted forward communication pathway 14W interconnects Ineuron module $in_2$ to forward neuron $n_{6F}$ in neuron group $NG_6$. Spikes received by Ineuron module $in_2$ from forward neurons 11A on the remote processor $p_1$ are distributed to every forward neuron 11A on the local processor $p_3$ via the weighted forward communication pathways 14W.

Further, a fourth weighted backward communication pathway 15W interconnects backward neuron $n_{4B}$ in neuron group $NG_4$ to Ineuron module $in_2$, a fifth weighted backward communication pathway 15W interconnects backward neuron $n_{5B}$ in neuron group $NG_5$ to Ineuron module $in_2$, and a sixth weighted backward communication pathway 15W interconnects backward neuron $n_{6B}$ in neuron group $NG_6$ to Ineuron module $in_2$. The fourth weighted backward communication pathway 15W has the same synaptic weight as the fourth weighted forward communication pathway 14W, the fifth weighted backward communication pathway 15W has the same synaptic weight as the fifth weighted forward communication pathway 14W, and the sixth weighted backward communication pathway 15W has the same synaptic weight as the sixth weighted forward communication pathway 14W.

Each backward neuron 11B on remote processor $p_1$ adds each aggregated synaptic weight received from Ineuron module $in_1$ and $in_2$ to its activation level which is then compared to the spiking threshold of said backward neuron 11B to determine if said backward neuron 11B should spike.

Figure 7:
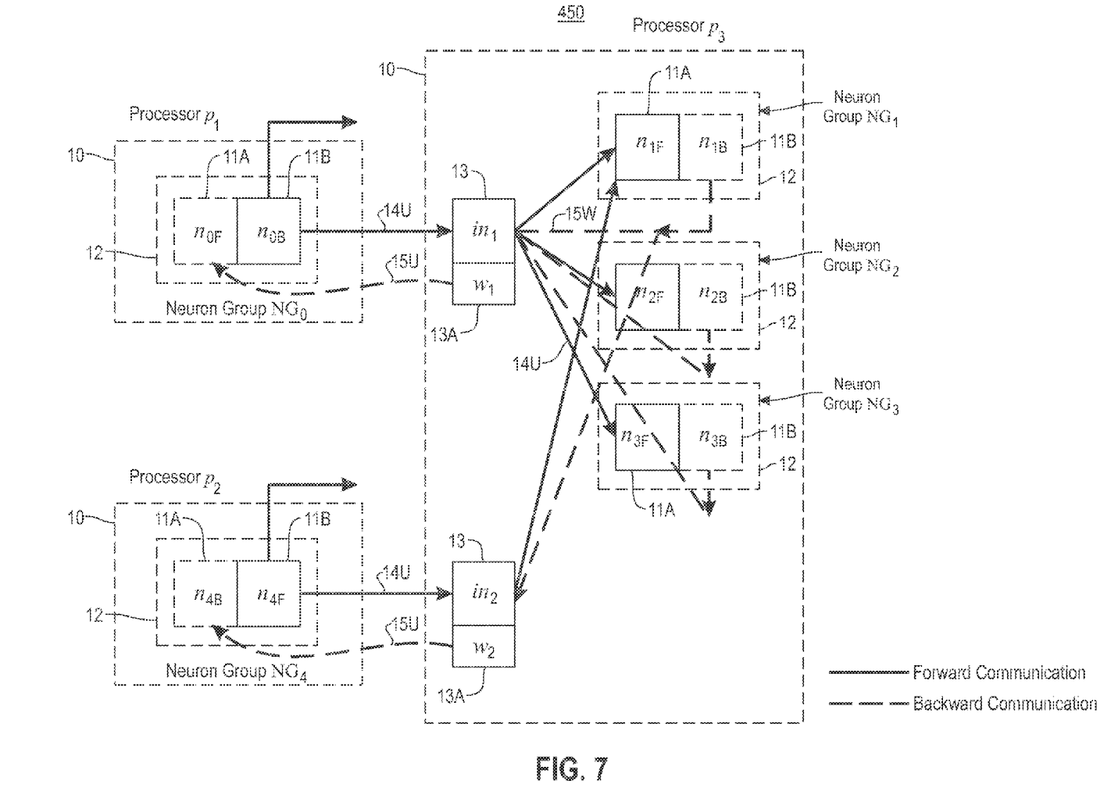
FIG. 7 is a block diagram illustrating a distributed simulation framework that allows reciprocal communication between multiple processors, in accordance with an embodiment of the invention.

FIG. 7 is a block diagram illustrating a distributed simulation framework 450 that allows reciprocal communication between multiple processors 10, in accordance with an embodiment of the invention. The framework 450 comprises multiple processors 10, such as processors $p_1$, $p_2$ and $p_3$. Each processor 10 comprises at least one neuron group 12. As shown in FIG. 7, processor $p_1$ includes neuron group $NG_0$, processor $p_3$ includes neuron groups $NG_1$, $NG_2$, and $NG_3$, and processor $p_2$ includes neuron group $NG_4$.

Each neuron group 12 comprises at least one neuron 11. As shown in FIG. 7, each neuron group 12 in the framework 450 comprises a forward neuron 11A and a corresponding backward neuron 11B. Specifically, the neuron group $NG_0$ includes a forward neuron $n_{0F}$ and a corresponding backward neuron $n_{0B}$, the neuron group $NG_1$ includes a forward neuron $n_{1F}$ and a corresponding backward neuron $n_{1B}$, the neuron group $NG_2$ includes a forward neuron $n_{2F}$ and a corresponding backward neuron $n_{2B}$, the neuron group $NG_3$ includes a forward neuron $n_{3F}$ and a corresponding backward neuron $n_{3B}$, and the neuron group $NG_4$ includes a forward neuron $n_{4F}$ and a corresponding backward neuron $n_{4B}$.

The framework 450 further comprises multiple communication pathways 5 and multiple Ineuron modules 13. As shown in FIG. 7, processor $p_3$ further includes Ineuron modules $in_1$ and $in_2$.

As shown in FIG. 7, processors $p_1$ and $p_2$ are the corresponding remote processors 10 for Ineuron modules $in_1$ and $in_2$, respectively. Ineuron module $in_1$ is interconnected to forward neuron $n_{0F}$ and backward neuron $n_{0B}$ in neuron group $NG_0$ on remote processor $p_1$ via a first unweighted forward communication pathway 14U and a first reciprocal unweighted backward communication pathway 15U, respectively. Ineuron module $in_2$ is interconnected to forward neuron $n_{4F}$ and backward neuron $n_{4B}$ in neuron group $NG_4$ on remote processor $p_2$ via a second unweighted forward communication pathway 14U and a second reciprocal unweighted backward communication pathway 15U, respectively.

Ineuron module $in_1$ is further interconnected to every neuron group 12 on processor $p_3$. A first weighted forward communication pathway 14W interconnects Ineuron module $in_1$ to forward neuron $n_{1F}$ in neuron group $NG_1$, a second weighted forward communication pathway 14W interconnects Ineuron module $in_1$ to forward neuron $n_{2F}$ in neuron group $NG_2$, and a third weighted forward communication pathway 14W interconnects Ineuron module $in_1$ to forward neuron $n_{3F}$ in neuron group $NG_3$. Spikes received by Ineuron module in from forward neurons 11A on the remote processor $p_1$ are distributed to every forward neuron 11A on the local processor $p_3$ via the weighted forward communication pathways 14W.

Further, a first weighted backward communication pathway 15W interconnects backward neuron $n_{1B}$ in neuron group $NG_1$ to Ineuron module $in_1$, a second weighted backward communication pathway 15W interconnects backward neuron $n_{2B}$ in neuron group $NG_2$ to Ineuron module $in_1$, and a third weighted backward communication pathway 15W interconnects backward neuron $n_{3B}$ in neuron group $NG_3$ to Ineuron module $in_1$. The first weighted backward communication pathway 15W has the same synaptic weight as the first weighted forward communication pathway 14W, the second weighted backward communication pathway 15W has the same synaptic weight as the second weighted forward communication pathway 14W, and the third weighted backward communication pathway 15W has the same synaptic weight as the third weighted forward communication pathway 14W.

Ineuron module $in_2$ is further interconnected to neuron group $NG_1$ on processor $p_3$. A fourth weighted forward communication pathway 14W interconnects Ineuron module $in_2$ to forward neuron $n_{1F}$ in neuron group $NG_1$. Spikes received by Ineuron module $in_2$ from forward neurons 11A on the remote processor $p_2$ are distributed to forward neuron $n_{1F}$ on the local processor $p_3$ via the fourth weighted forward communication pathway 14W. Further, a fourth weighted backward communication pathway 15W interconnects backward neuron $n_{1B}$ in neuron group $NG_1$ to Ineuron module $in_2$. The fourth weighted backward communication pathway 15W has the same synaptic weight as the fourth weighted forward communication pathway 14W.

If neuron $n_{1B}$ within neuron group $NG_1$ spikes, the Ineuron modules $in_1$ and $in_2$ each send an aggregated synaptic weight to the backward neurons $n_{1B}$ and $n_{4B}$ in neuron groups $NG_0$ and $NG_4$, respectively.

Figure 8:
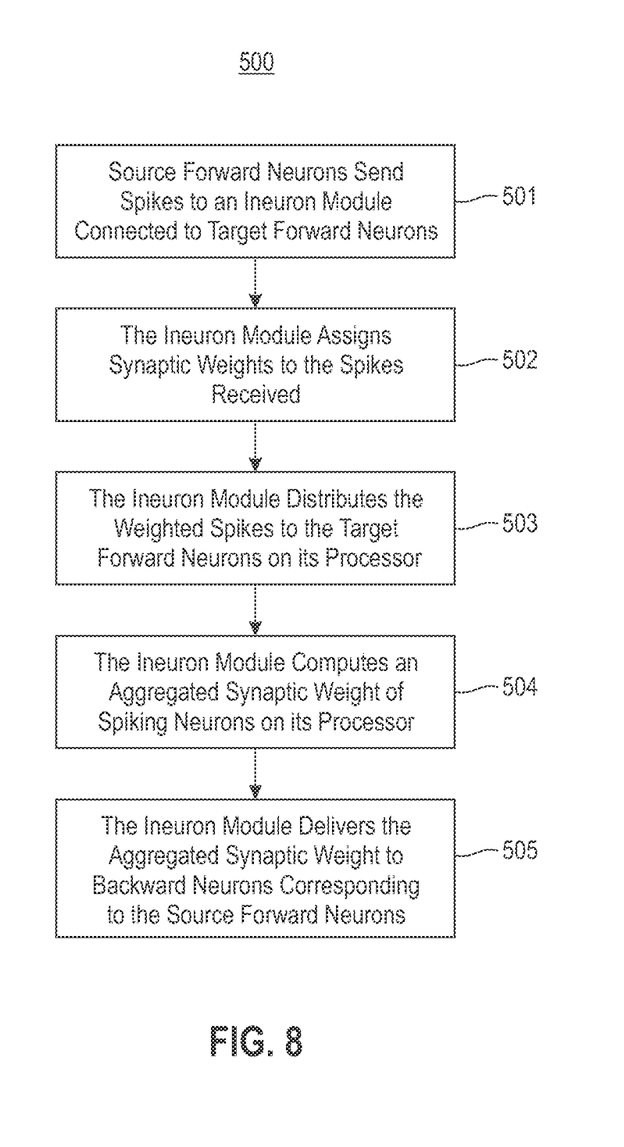
FIG. 8 illustrates a flowchart of an example process for a simulation framework, in accordance with an embodiment of the invention.

FIG. 8 illustrates a flowchart of an example process 500 for a simulation framework, in accordance with an embodiment of the invention. In process block 501, source forward neurons 11A send spikes to an Ineuron module 13 connected to target forward neurons 11A. In process block 502, the Ineuron module 13 assigns synaptic weights to the spikes received. In process block 503, the Ineuron module 13 distributes the weighted spikes to the target forward neurons 11A on its processor 10. In process block 504, the Ineuron module 13 computes an aggregated synaptic weight of spiking neurons 11 on its processor 10. In process block 505, the Ineuron module 13 delivers the aggregated synaptic weight to backward neurons 11B corresponding to the source forward neurons 11A.

Figure 9:
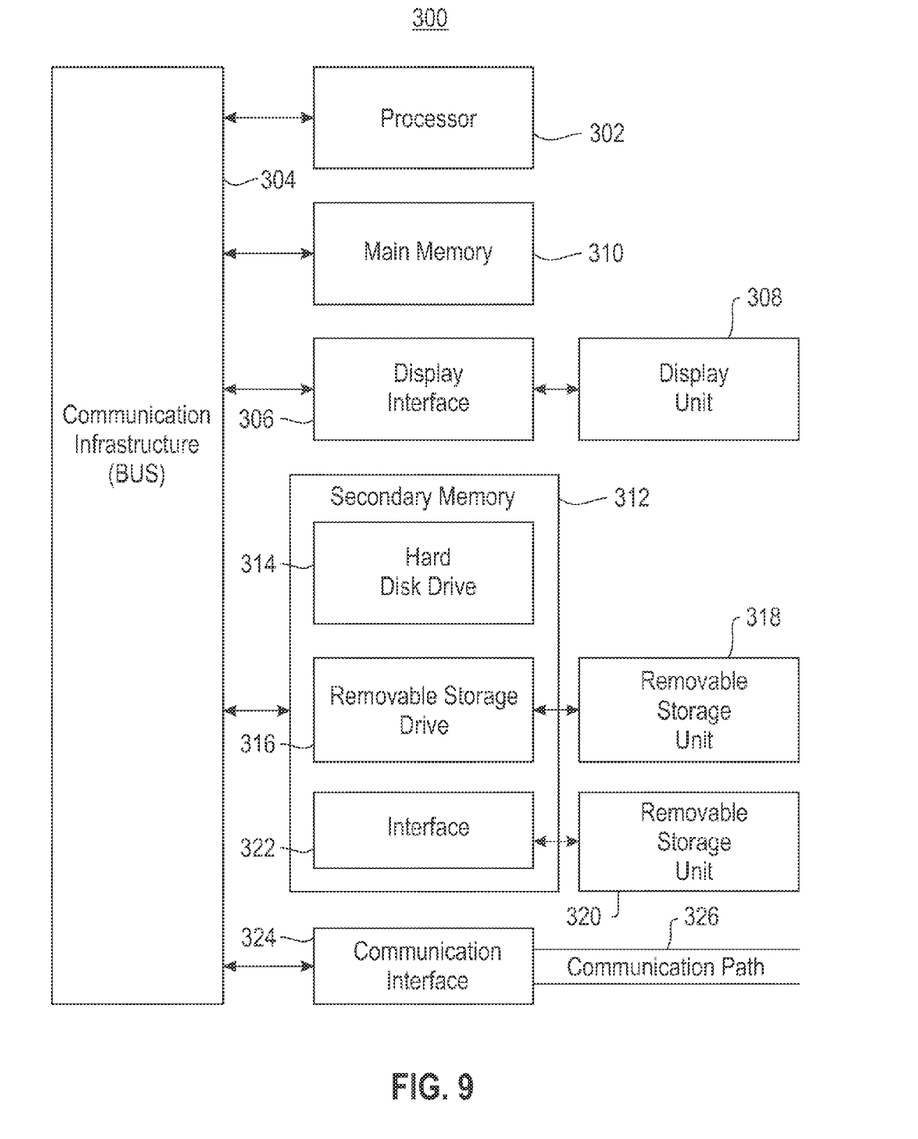
FIG. 9 is a high level block diagram showing an information processing circuit useful for implementing one embodiment of the invention.

FIG. 9 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for hierarchical routing and two-way information flow with structural plasticity in neural networks. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    interconnecting neuron groups on different processors via a plurality of reciprocal communication pathways that include at least one weighted forward communication pathway and at least one weighted backward communication pathway; and
    facilitating the exchange of reciprocal spiking communication between two different processors using at least one Ineuron module;
    wherein each Ineuron module maintains synaptic weights of each weighted forward communication pathway and each weighted backward communication pathway that said Ineuron module is connected to;
wherein each processor includes at least one neuron group; and
wherein each neuron group includes at least one electronic neuron.

2. The method of claim 1, wherein:
said plurality of reciprocal communication pathways further include:
at least one unweighted forward communication pathway and at least one unweighted backward communication pathway configured for information flow in a first direction and a second direction opposite to the first direction, respectively, wherein each unweighted forward communication pathway has a reciprocal unweighted backward communication pathway;
each weighted forward communication pathway and each weighted backward communication pathway is configured for information flow in the first direction and the second direction, respectively;
and each weighted forward communication pathway has a reciprocal weighted backward communication pathway.

3. The method of claim 2, further comprising:
for each Ineuron module:
receiving spikes from at least one neuron in a neuron group on a remote processor via an unweighted forward communication pathway interconnecting the neuron group on the remote processor to said Ineuron module; and
distributing the received spikes to at least one neuron in a neuron group on a local processor via a weighted forward communication pathway interconnecting said Ineuron module to the neuron group on the local processor.

4. The method of claim 3, wherein:
each Ineuron module includes a memory unit for maintaining synaptic weights of every weighted forward communication pathway and every weighted backward communication pathway that said Ineuron module is connected to.

5. The method of claim 4, further comprising:
for each Ineuron module:
assigning a synaptic weight to a received spike before distributing the received spike to at least one neuron in a neuron group on the local processor, wherein the synaptic weight assigned is equal to a synaptic weight of a weighted forward communication pathway delivering the received spike to the neuron group on the local processor.

6. The method of claim 5, further comprising:
for each Ineuron module:
receiving spikes from at least one spiking neuron in a neuron group on the local processor via a weighted backward communication pathway interconnecting the neuron group on the local processor to said Ineuron module;
computing an aggregated synaptic weight, wherein the computed aggregated synaptic weight is the sum of the synaptic weights of every weighted backward communication pathway interconnecting a spiking neuron on the local processor to said Ineuron module; and
delivering the computed aggregated synaptic weight to at least one neuron in a neuron group on the remote processor via an unweighted backward communication pathway interconnecting the neuron group on the remote processor to said Ineuron module.

7. The method of claim 6, wherein:
each weighted forward communication pathway has a synaptic weight that is equal to a synaptic weight of a reciprocal weighted backward communication pathway.

8. The method of claim 7, further comprising:
for each neuron:
integrating aggregated synaptic weights and spikes into a membrane potential of said neuron; and
generating a spike signal in response to the membrane potential of said neuron reaching a threshold of said neuron.

9. An apparatus comprising:
multiple processors;
each processor including at least one neuron group, wherein each neuron group includes at least one electronic neuron;
a plurality of reciprocal communication pathways interconnecting neuron groups on different processors, wherein said plurality of reciprocal communication pathways include at least one weighted forward communication pathway and at least one weighted backward communication pathway; and
at least one Ineuron module, wherein each Ineuron module facilitates the exchange of reciprocal spiking communication between two different processors, and wherein each Ineuron module maintains synaptic weights of each weighted forward communication pathway and each weighted backward communication pathway that said Ineuron module is connected to.

10. The apparatus of claim 9, wherein:
said plurality of reciprocal communication pathways further include:
at least one unweighted forward communication pathway and at least one unweighted backward communication pathway configured for information flow in a first direction and a second direction opposite to the first direction, respectively, wherein each unweighted forward communication pathway has a reciprocal unweighted backward communication pathway;
each weighted forward communication pathway and each weighted backward communication pathway is configured for information flow in the first direction and the second direction, respectively; and
each weighted forward communication pathway has a reciprocal weighted backward communication pathway.

11. The apparatus of claim 10, wherein:
each Ineuron module is configured to:
receive spikes from at least one neuron in a neuron group on a remote processor via an unweighted forward communication pathway interconnecting the neuron group on the remote processor to said Ineuron module; and
distribute the received spikes to at least one neuron in a neuron group on a local processor via a weighted forward communication pathway interconnecting said Ineuron module to the neuron group on the local processor.

12. The apparatus of claim 11, wherein:
each Ineuron module includes a memory unit for maintaining synaptic weights of every weighted forward communication pathway and every weighted backward communication pathway that said Ineuron module is connected to.

13. The apparatus of claim 12, wherein:
each Ineuron module is further configured to:

assign a synaptic weight to a received spike before distributing the received spike to at least one neuron in a neuron group on the local processor, wherein the synaptic weight assigned is equal to a synaptic weight of a weighted forward communication pathway delivering the received spike to the neuron group on the local processor.

14. The apparatus of claim 13, wherein:
each Ineuron module is further configured to:
    receive spikes from at least one spiking neuron in a neuron group on the local processor via a weighted backward communication pathway interconnecting the neuron group on the local processor to said Ineuron module;
    compute an aggregated synaptic weight, wherein the computed aggregated synaptic weight is the sum of the synaptic weights of every weighted backward communication pathway interconnecting a spiking neuron on the local processor to said Ineuron module; and
    deliver the computed aggregated synaptic weight to at least one neuron in a neuron group on the remote processor via an unweighted backward communication pathway interconnecting the neuron group on the remote processor to said Ineuron module.

15. The apparatus of claim 14, wherein:
each weighted forward communication pathway has a synaptic weight that is equal to a synaptic weight of a reciprocal weighted backward communication pathway.

16. The apparatus of claim 15, wherein:
each neuron is configured to:
    integrate aggregated synaptic weights and spikes into a membrane potential of said neuron; and
    generate a spike signal in response to the membrane potential of said neuron reaching a threshold of said neuron.

17. A non-transitory computer-useable storage medium for interconnecting neuron groups on different processors, the computer-useable storage medium having a computer-readable program, wherein the program upon being processed on a computer causes the computer to implement:
    interconnecting said neuron groups via a plurality of reciprocal communication pathways that include at least one weighted forward communication pathway and at least one weighted backward communication pathway; and
    facilitating the exchange of reciprocal spiking communication between two different processors using at least one Ineuron module;
    wherein each Ineuron module maintains synaptic weights of each weighted forward communication pathway and each weighted backward communication pathway that said Ineuron module is connected to;
    wherein each processor includes at least one neuron group; and
    wherein each neuron group includes at least one electronic neuron.

18. The program of claim 17, wherein:
said plurality of reciprocal communication pathways further include:
    at least one unweighted forward communication pathway and at least one unweighted backward communication pathway configured for information flow in a first direction and a second direction opposite to the first direction, respectively, wherein each unweighted forward communication pathway has a reciprocal unweighted backward communication pathway;
    each weighted forward communication pathway and each weighted backward communication pathway is configured for information flow in the first direction and the second direction, respectively; and
    each weighted forward communication pathway has a reciprocal weighted backward communication pathway.

19. The program of claim 18, wherein the program upon being processed on the computer further causes the computer to implement:
    for each Ineuron module:
        receiving spikes from at least one neuron in a neuron group on a remote processor via an unweighted forward communication pathway interconnecting the neuron group on the remote processor to said Ineuron module; and
        distributing the received spikes to at least one neuron in a neuron group on a local processor via a weighted forward communication pathway interconnecting said Ineuron module to the neuron group on the local processor.

20. The program of claim 19, wherein the program upon being processed on the computer further causes the computer to implement:
    for each Ineuron module:
        assigning a synaptic weight to a received spike before distributing the received spike to at least one neuron in a neuron group on the local processor, wherein the synaptic weight assigned is equal to a synaptic weight of a weighted forward communication pathway delivering the received spike to the neuron group on the local processor;
        receiving spikes from at least one spiking neuron in a neuron group on the local processor via a weighted backward communication pathway interconnecting the neuron group on the local processor to said Ineuron module;
        computing an aggregated synaptic weight, wherein the computed aggregated synaptic weight is the sum of the synaptic weights of every weighted backward communication pathway interconnecting a spiking neuron on the local processor to said Ineuron module; and
        delivering the computed aggregated synaptic weight to at least one neuron in a neuron group on the remote processor via an unweighted backward communication pathway interconnecting the neuron group on the remote processor to said Ineuron module;
    wherein said Ineuron module includes a memory unit for maintaining synaptic weights of every weighted forward communication pathway and every weighted backward communication pathway that said Ineuron module is connected to.

* * * * *